March 24, 1970  S. BRITTON  3,502,023
PARACHUTE-BORNE PYROTECHNIC DEVICE
Filed Nov. 17, 1967

Inventor:
Stanley Britton
By Michael S. Striker
Attorney

United States Patent Office 3,502,023
Patented Mar. 24, 1970

3,502,023
PARACHUTE-BORNE PYROTECHNIC DEVICE
Stanley Britton, Redhill, England, assignor to Schermuly Limited, Dorking, Surrey, England, a British company
Filed Nov. 17, 1967, Ser. No. 684,041
Claims priority, application Great Britain, Nov. 22, 1966, 52,217/66
Int. Cl. F42b 13/38
U.S. Cl. 102—35.6                        6 Claims

ABSTRACT OF THE DISCLOSURE

This invention relates to a pyrotechnic device of the kind comprising a container, a parachute packed in the container, a pyrotechnic store within the container and connected to said parachute and means for ejecting the parachute and the pyrotechnic store from the container, in which the parachute is connected to said container by a flexible member of a length sufficient to allow the pyrotechnic store to leave the container when said ejecting means is initiated and which is breakable as a consequence of separation of the container and the store following ejection of the latter from the former.

---

This invention relates to an improved pyrotechnic device of the kind comprising a container, a parachute packed in the container, a pyrotechnic store within the container and connected to said parachute, and means for ejecting the parachute and the pyrotechnic store from the container. Common examples of such pyrotechnic devices are illuminating flares, in which case the pyrotechnic store is a flare candle, and distress signals, in which case the pyrotechnic store is a luminous signalling device.

When the parachute and pyrotechnic store of a pyrotechnic device of the kind referred to are ejected from the container after the pyrotechnic device has been projected into the atmosphere, for example launched by a rocket or discharged from an aircraft, it is very desirable that the parachute deploys at the earliest possible moment. In this way the pyrotechnic store is rapidly arrested from free fall and commences its parachute-controlled descent from the greatest possible height, so ensuring that the best advantage is made of its pyrotechnic effect. However, when the parachute is ejected from its container, it has a tendency to retain its packed configuration for some time before the air can fill the canopy of the parachute and fully deploy the latter. This occurs however carefully the parachute is packed in its container, irrespective of the fabric used for making the canopy, and even when the fabric is lubricated, for example with talc. Due to this, the ejected parachute and pyrotechnic store lose height rapidly at the commencement of their descent and the store can, in tumbling, seriously burn the canopy of the parachute and/or its rigging lines.

In the case of large parachutes released from aircraft deployment is often accelerated either by another parachute, which is ejected quickly and acts as a drogue to pull out the main parachute, or by connecting the parachute by a static cord to the aircraft, which cord, after pulling out the parachute, is severed from the aircraft by the breakage of a weak link. These methods, however, are not suitable for employment with pyrotechnic devices of the kind referred to due to considerations of weight and cost.

An object of the present invention is to provide a pyrotechnic device of the kind referred to in which deployment of the parachute occurs more rapidly than in hitherto known pyrotechnic devices.

According to the invention, in a pyrotechnic device of the kind referred to, the canopy of the parachute is connected to said container by a flexible member of a length at least sufficient to allow the parachute and its associated pyrotechnic store to leave the container when said ejecting means is initiated and which is breakable as a consequence of separation of the container and the store following ejection of the latter from the former.

Preferably, the flexible member is a length of filamentary material for example wire or a thread of natural or synthetic fibrous material, for example cotton or nylon. The flexible member may comprise one or more links not intended to break and a weak link which is intended to break as a consequence of the forces exerted on it following ejection of the store. Preferably, the weak link secures the stronger link or links to the canopy so that on breakage of the weak link the strong link or links remain attached to the container.

The flexible member may be attached at one end to the interior of the container and at its other end to the apex of the parachute canopy. Preferably, the flexible member has a length which is greater than the combined overall length of the deployed parachute and the pyrotechnic store.

When the ejecting means of a pyrotechnic device in accordance with the invention is initiated, the parachute and the pyrotechnic store are ejected and the container is propelled in the opposite direction until the limit of said flexible member is reached. Continued motion of the pyrotechnic store away from the container then causes the parachute to unfold until its rigging lines are fully extended. When the rigging lines have been fully extended the flexible member is subjected to the pull of the moving pyrotechnic store, which is sufficient to break the flexible member. The container then falls free and the pyrotechnic store commences its parachute-controlled descent.

One embodiment of a pyrotechnic device in accordance with the invention will now be described, by way of example, with reference to the accompanying drawing, in which.

Figure 1:
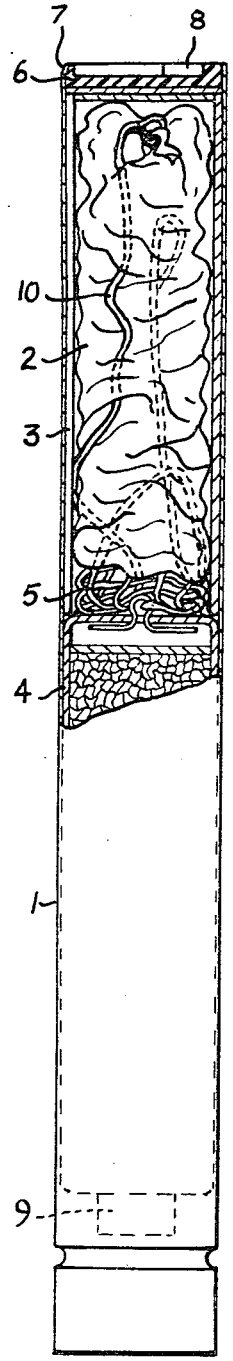
FIGURE 1 is a partly sectioned side elevation of the device.
Figure 2:
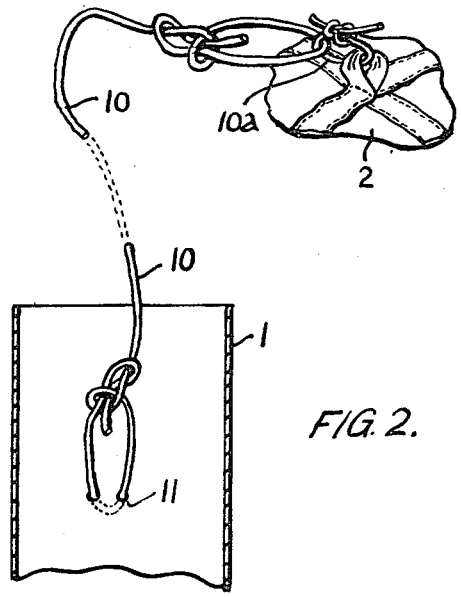
FIGURE 2 is a detail on an enlarged scale showing how the flexible member linking the parachute to the container of the device of FIGURE 1 is secured.
Figure 3:
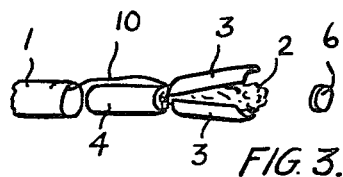
FIGURES 3 and 6 are schematic representations of the device of FIGURE 1 during operation.
Figure 4:
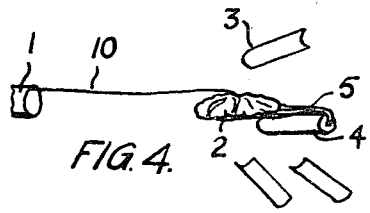
Figure 5:
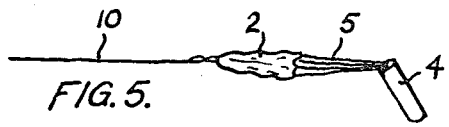
Figure 6:
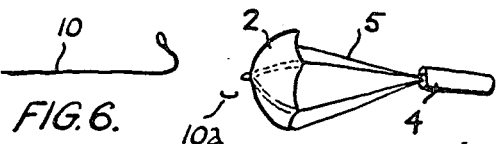

Referring to the drawing, the pyrotechnic device comprises a tubular container 1, slidably receiving a parachute 2 in a split tube 3 and an illuminating flare 4 attached to the parachute 2 via rigging lines 5. The container 1 is closed by a plug 6 held in place by regions 7 of the tubular container 1 which are bent inwardly into recesses 8 of the plug 6. The container houses an ejecting charge 9 for forcing the flare 4, the tube 3 and the cap 6 out of the container. The apex of the canopy of the parachute 2 is attached to the container 1 by a flexible cord 10 of 60 lbs. breaking load, and a loop 10a of a lighter cord of 25 lbs. breaking load. The end of the cord 10 remote from the parachute is tied through holes 11 in the container 1 adjacent to the end receiving the plug 6. The exact mode of attachment can be seen in FIGURE 2.

FIGURES 3 to 6 show various sequential stages in the ejection of the parachute and its associated flare from which it can be seen that tube 3 opens to release the parachute 2 and that the cord 10 and loop 10a cause the parachute 2 to be retarded relative to the flare 4 until the rigging lines 5 are fully extended, the loop 10a then breaking to allow the flare 4 to descend freely under the influence of the parachute 2.

It will be appreciated that the breaking loads of the cord and loop should be chosen with regard to the magnitude of the ejecting charge, and in the specific example given, the charge was capable of generating a thrust of 60 lbs. With other ejecting charges of the same or different magnitude, cards of different breaking load can be employed, provided the breaking load of the weakest link is less than the force exerted on the parachute 2 and the flare 4 by the ejecting charge (i.e., the weakest link will break as a consequence of the separation of the container and the flare following ejection of the latter from the former).

Although the invention has been particularly described with reference to a two-part flexible member (i.e., the cord 10 and the loop 10a) alternative forms of flexible member may be used. Thus, for example, wires can be used which are in one or more parts, or chains with one or more of the links susceptable to breakage on ejection of the flare from the container.

What is claimed is:

1. A pyrotechnic device, comprising a container having an open end provided with a closure, and a closed end; a parachute stowed in said container adjacent said open end and having a canopy and rigging lines; a pyrotechnic store stowed in said container intermediate said parachute and said closed end and being secured to at least one of said rigging lines; ejecting means operative for forcibly ejecting said parachute and said pyrotechnic store through said open end; and flexible means connecting said canopy of said parachute with said container and arranged to break subsequent to separation of said parachute and pyrotechnic store from said container following their ejection by said ejecting means.

2. A pyrotechnic device as defined in claim 1, said flexible means having a length at least sufficient to permit complete separation of said parachute and pyrotechnic store from said container, and being provided with a weakened portion located immediately adjacent the apex of said canopy of said parachute.

3. A pyrotechnic device as defined in claim 1, wherein said flexible means comprises a flexible member having a length at least sufficient to permit complete separation of said parachute and pyrotechnic store from said container.

4. A pyrotechnic device as defined in claim 3, said flexible member having a weakened portion for facilitating breaking of said flexible member.

5. A pyrotechnic device as defined in claim 1, said flexible means having a weakened portion located adjacent said canopy of said parachute.

6. A pyrotechnic device as defined in claim 1, said flexible means including a flexible member having a length greater than the combined length of said pyrotechnic store and said parachute in deployed condition of the latter.

References Cited

UNITED STATES PATENTS

| | | | |
|---|---|---|---|
| 1,781,621 | 11/1930 | Wiley. | |
| 1,588,639 | 6/1926 | Wiley | 102—35 |
| 2,036,278 | 4/1936 | King | 102—35 |
| 1,754,986 | 4/1930 | Driggs et al. | 102—35.6 X |
| 2,834,293 | 5/1958 | Beach et al. | 102—35.6 X |

ROBERT F. STAHL, Primary Examiner